United States Patent [19]

Dotter, Jr.

[11] 3,906,174

[45] Sept. 16, 1975

[54] CABLE PAIR TESTING ARRANGEMENT

[75] Inventor: Berton E. Dotter, Jr., Belmont, Calif.

[73] Assignee: GTE Automatic Electric Laboratories Incorporated, Northlake, Ill.

[22] Filed: Nov. 16, 1973

[21] Appl. No.: 416,480

[52] U.S. Cl. ........................ 179/175.3 R; 178/69 R

[51] Int. Cl.$^2$ ........................................ H04B 3/46

[58] Field of Search .................. 179/175.3 R, 16 F; 178/69 R, 69 A, 69 N, 63 E; 328/162; 340/146.1 E, 146.1 AB

[56] References Cited

UNITED STATES PATENTS

| | | | |
|---|---|---|---|
| 2,996,578 | 8/1961 | Andrews | 178/70 |
| 3,048,819 | 8/1962 | Helder et al. | 340/146.1 AB |
| 3,062,927 | 11/1962 | Hamori | 179/175.31 R |
| 3,083,270 | 3/1963 | Mayo | 179/175.31 R |
| 3,136,851 | 6/1964 | Crowson et al. | 179/175.3 |
| 3,415,947 | 12/1968 | Abbey et al. | 179/175.3 R |
| 3,526,713 | 9/1970 | Elvis et al. | 178/69 N |

*Primary Examiner*—Kathleen H. Claffy
*Assistant Examiner*—Douglas W. Olms
*Attorney, Agent, or Firm*—Leonard R. Cool; Russell A. Cannon

[57] ABSTRACT

A pseudo-random, pseudo-ternary pulse train, which is representative of a PCM signal, is applied to one end of a cable pair. At the other end of the cable pair, the received pulse train is equalized and amplified to obtain a pulse train output in which pulses have very nearly the same peak amplitude as each transmitted pulse, plus a characteristic which is similar but not identical. A variable amplitude interfering tone is combined with the equalized and amplified received pulse train. If no errors are determined by an error detector with a 0 amplitude interfering tone, the amplitude is increased until errors occur. The interfering amplitude control is calibrated in terms of eye degradation factor. The magnitude of the eye degradation factor is determinative of the capability of the cable pair to transmit the PCM signal with an acceptable error rate.

18 Claims, 12 Drawing Figures

CABLE PAIR TESTING ARRANGEMENT

BACKGROUND OF THE INVENTION

1. Field of the Invention

This invention relates to transmission testing of cable pairs and in particular to the evaluation of the transmission of a pseudo-random, pseudo-ternary pulse train such as is used in present-day pulse code modulation systems.

2. Description of the Prior Art

Rather than to attempt a measurement which is representative of the transmission characteristics of the cable pair, most prior-art testing and measuring apparatus attempt to measure pulse signal impairment or distortion of a data signal. Such devices are exemplified by U.S. Pat. Nos. 3,057,957 Gibby et al, "Apparatus for Measuring Data Signal Impairment;" Gibby et al 3,155,772, "Method for Measuring Data Signal Impairment;" Favin, U.S. Pat. No. 3,041,540, "Data Signal Distortion Measuring Circuit;" and, Becker et al, U.S. Pat. No. 3,391,249, "Circuit for Measuring a Telegraphic Signal Impairment." Other devices were used to transmit signals through a repeater section or a multiplicity of repeater sections in a pulse code modulation system as generally illustrated in FIG. 1, and such devices were used primarily to test the repeater rather than the cable pair per se, and these are exemplified by patents Mayo, U.S. Pat. No. 3,083,270, "Pulse Repeater Marginal Testing System;" and, Hamori, U.S. Pat. No. 3,062,927, "Pulse Repeater Testing Arrangement." A review of the teachings in these patents illustrates that the testing is accomplished subsequent to the installation of the equipment. What is desirable in the telephone plant is to determine whether or not certain cable pairs have the capability for the transmission of a PCM signal prior to the installation of the equipment. One way in which this information could be obtained is to use a test oscillator at the transmitting end and a loss-measuring test set at the receiving end such that the loss frequency characteristic throughout the frequency range of interest may be determined. A problem with this technique is that it is extremely time-consuming and does not actually test the cable pairs in accordance with the signal which would be applied to them during the operation of the normal PCM multiplexing equipment.

An example of a PCM system which has gained wide acceptance in the telephone industry is a 24-channel PCM system operating at 1.544 Mbits per second over standard paired telephone exchange cable. The pulse code signal is in bipolar format. Regenerative repeaters are employed and these are spaced at approximately 6,000 foot intervals. In order to determine whether or not a particular cable pair between central offices would provide acceptable transmission characteristics, it is necessary to test each repeater section quickly and accurately.

The bipolar signal is pseudo-ternary in character. A bipolar signal is often derived by conversion of a unipolar (binary) signal. The coding rule is that successive pulses, whenever and wherever they occur in the unipolar pulse train, are changed into successive pulses having opposite polarities. Thus, a binary train of 011 000 101 001 would become 0+— 000 +0— 00+. A violation of the coding rule would indicate an error and such errors may be readily detected. There are other pseudo-ternary signals that follow specific coding rules, the violation of which can be used to detect errors. One such pseudo-ternary signal is denominated doubinary. Reference may be made to U.S. Pat. Nos. of Lender, 3,238,299, High-Speed Data Transmission System; Dotter, 3,303,462, Error Detection in Duobinary Data System; and, Lender, 3,337,864, Duobinary Conversion, Reconversion and Error Detection, for an understanding of the character of the pseudo-ternary signal and of techniques by which errors may be detected.

SUMMARY OF THE INVENTION

It is therefore an object of the invention to provide means for making an accurate performance test of a cable pair quickly and a reasonable cost.

A pseudo-random, pseudo-ternary pulse train is applied at one end of the cable pair and suffers degradation because of crosstalk noise and the transmission characteristics of the cable pair. At the receiving end, the pseudo-random, pseudo-ternary pulse train is first equalized and amplified so that a pulse, no-pulse decision can be made. After the pulse, no-pulse decisions are made, an error detector determines if there are errors in the received signal. If there are errors, the cable pair is not acceptable. If not, a variable amplitude interfering tone is added to the amplified and equalized pulse train prior to the pulse, no-pulse determination. The amplitude of the interfering tone applied is related to an eye degradation factor and when errors occur, the eye degradation can be determined.

BRIEF DESCRIPTION OF THE DRAWINGS

FIG. 3(*b*) shows the effect of degradation of the eye pattern which may result because of interference, such as noise and phase distortion, affecting a pulse signal during transmission.

FIG. 10($b$) is an electrical circuit which includes the bipolar violation detector and error indication circuitry.

DETAILED DESCRIPTION OF INVENTION

Figure 1:
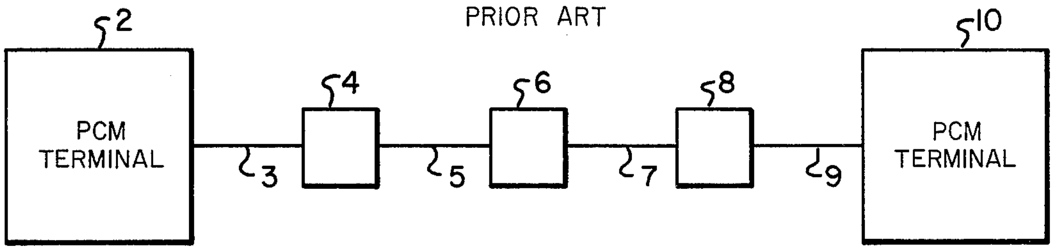
FIG. 1 is a simplified block diagram of a prior-art carrier system which employs pulse code modulation.

A PCM system is shown in FIG. 1. Such systems are well known in the art as is exemplified by the article, "Solid-State Cable Carrier Using Pulse Code Modulation," by H. E. Stallman and L. D. Crawforth in the Automatic Electric Technical Journal, volume 12, No. 1, January 1970. The transmitter portion of PCM terminal 2, for example, would convert a continuously varying analog signal into digital form for transmission. In order to eliminate the low-frequency component and to reduce dc wander, the binary signal is converted into a bipolar format for transmission over a cable pair in cable section 3. Other cable sections are shown at 5, 7, and 9 in FIG. 1, and the length of the cable sections is determined primarily by the attenuation of the signal and the ability of the repeaters shown at 4, 6, and 8 to reconstruct and regenerate the original transmitted pulse train. In order to reconstruct the pulse train, three important functions must be performed by each repeater: equalization, timing, and regeneration. The equalization process is designed to shape the pulses and, in addition, to raise their level by means of amplification to a point where a pulse, no-pulse decision can be made. Final reconstruction of the pulse train is accomplished by simultaneous operation of timing and regeneration. Pulse regeneration may be performed by a simple threshold detector. The time at which the threshold detector makes its decision is determined by a timing signal. The retiming circuit serves to remove most of the time jitter from the incoming pulse so that good, clean pulses are retransmitted. An effective retiming circuit also provides the means to sample incoming pulses at their peak so that any interference present will have the least effect. If the original transmitted wave from terminal 2 has been properly reconstructed at each repeater, then the original information can be recovered from the receiving circuitry of the PCM terminal 10 in FIG. 1.

Figure 2:
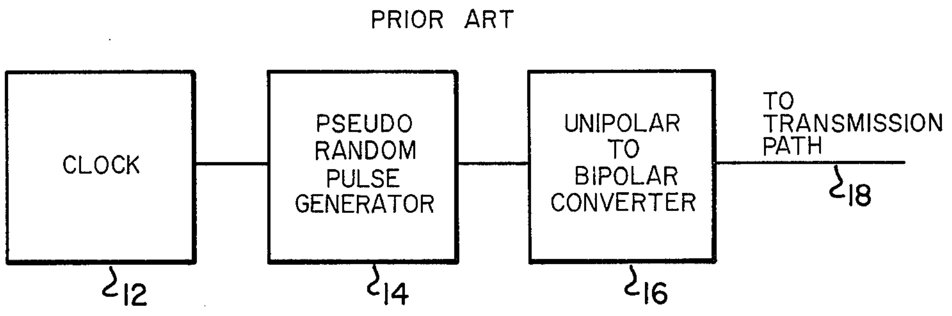
FIG. 2 is a block diagram which shows a prior-art arrangement for generating a pseudo-random bipolar pulse signal.

For test purposes it is not necessary to convert an analog signal into a binary-code format and thereafter convert the binary code into a bipolar signal for transmission over a cable pair of a cable section. However, in order to derive a signal which effectively simultates that which would be transmitted by a number of pulse-code modulated signals which are multiplexed to provide a number of channels in time sequence, a pseudo-random pulse train must be developed. Such pseudo-random pulse generators are known in the art, and one prior-art arrangement for deriving such a signal is shown in FIG. 2 in which clock 12 supplies clock pulses at the appropriate timed rate to pseudo-random pulse generator 14 which supplies a binary code output that is converted from unipolar format to bipolar format in converter 16 for transmission to transmission path 18. The bipolar signal has a characteristic which is important in determining the error rate of transmission. This characteristic is that each successive pulse has the opposite polarity from the last preceding pulse. Thus, in a received pulse train if two successive pulses have the same polarity, It is evident that one of the two must be in error.

Figure 3:
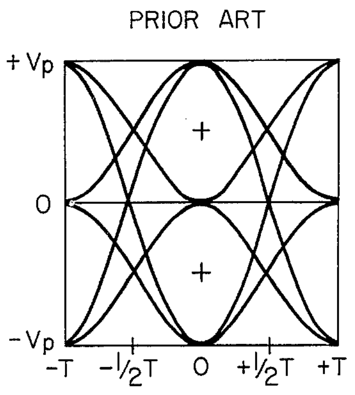
FIG. 3(*a*) shows an idealized eye diagram for a bipolar signal.
Figure 3:
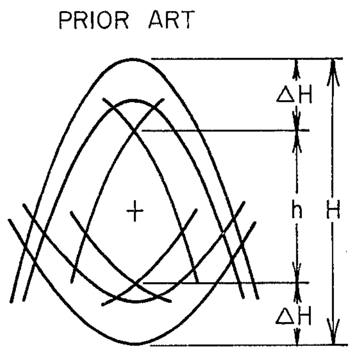

By superimposing oscilloscope traces of a series of successive data pulses, an eye pattern, well known in the art, may be obtained. An ideal eye pattern for a pseudo-ternary signal, such as a bipolar signal, is shown in FIG. 3($a$). The eyes shown are fully open and if the threshold detector detects at the zero time point, then the proper decision can be readily made. Normally, during transmission, however, there are extraneous signals introduced into the transmission path which cause variations in the pulse amplitude and result in distortion of the received waveform, both with respect to the amplitude and also with respect to timing. A single eye pattern with such distortion appearing in the received eye pattern is shown in FIG. 3($b$). A trained observer viewing the eye pattern as produced by superimposing a series of successive data pulses can determine whether or not the impairment to the signal is such that reliable transmission cannot be attained. The effect of this distortion is the degradation of the pulses which results in the reduced size of the ideal eye. Amplitude degradations cause the boundaries of the ideal eye to be shifted in a vertical direction by an amount $\Delta H$ as shown in FIG. 3($b$). Time degradations cause the boundaries of the ideal eye to be shifted in a horizontal direction. If we let the peak amplitude of the ideal eye be H, the amplitude of the degraded eye h will be equal to $H - 2\Delta H$. It is apparent that if the degradation is such that $h = H/2$ the eye will be closed. For the moment we will assume that the sampling point is selected so as to maximize the critical eye opening and therefore we need only concern ourselves with amplitude degradations. It should be apparent, however, that if the sampling interval is not correct that the degradation of the amplitude would quite possibly be increased and thus any type of measuring device which would be useful in determining amplitude degradation would, in effect, measure both impairments although which was of the primary fault would not be determinative from such a measurement. Note further that we are interested in the peak amplitude of the received pulse and that the threshold level of the detector would normally be established at one-half of the peak amplitude of the received pulse after it has been equalized and amplified to obtain a signal from which a pulse, no-pulse decision can be made. We may define the peak-normalized eye degradation, D, as $$D = \frac{H - (H - 2\Delta H)}{H} \quad (1)$$

$$D = \frac{2\Delta H}{H} \quad (2)$$

Figure 4:
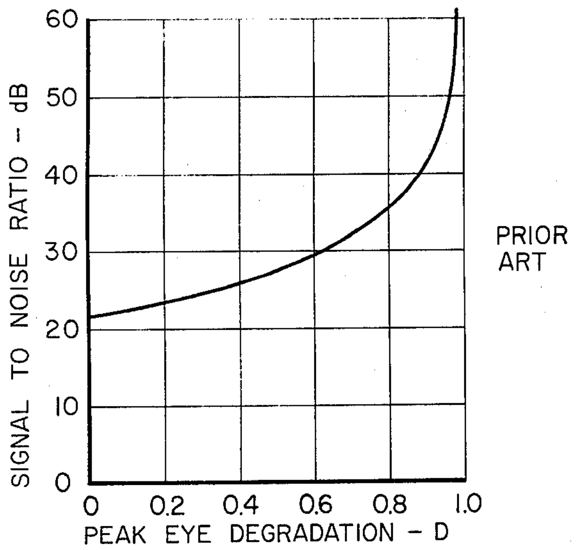
FIG. 4 illustrates the signal-to-noise requirements for an error rate of $10^{-10}$ for a three-level bipolar signal with various eye degradation factors.
Figure 5:
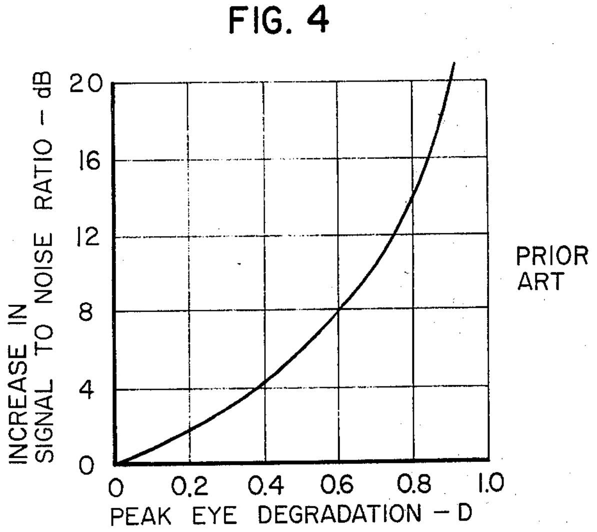
FIG. 5 illustrates the increase in signal-to-noise ratio required to maintain the $10^{-10}$ error rate for various eye degradation factors.

The degradation as discussed above is related to any disturbing influence in the transmission medium. It is of interest to note that in order to maintain a constant probability of error, when the eye degradation factor increases from zero to one, the signal-to-noise ratio must be increased. For an error probability of $10^{-10}$ the signal-to-noise ratio as a function of peak eye degradation is shown in FIG. 4. Of importance is the increase in signal-to-noise ratio that must be maintained in order to keep the probability of error unchanged as the peak eye degradation factor increases, and this is shown in FIG. 5. This latter relationship can be obtained as follows:

$$\Delta S/N = \frac{20 \log H}{\phantom{x}} \quad (3)$$

-Continued $$A - 2\Delta H$$

or $$\Delta S/N = \frac{-20 \log(1) - 2\Delta H}{H} \quad (4)$$

or $$\Delta S/N = -20 \log (1 - D) \quad (5)$$

From FIG. 5 we can see that an ideal cable section (D = 0) introduces no loss in noise margin. When the degradation factor increases to D = 0.5, the loss in noise margin is 6 dB, i.e., the signal-to-noise ratio must be increased by 6 dB in order to maintain the same error probability. However, when the peak eye degradation factor becomes 0.9, the loss in noise margin is 20 dB and is increasing rapidly.

Referring again to FIG. 3(*b*) it is apparent that only in the ideal case will the peak pulse amplitude H be obtained at the output of the equalizer and amplifier of the receiving section of a repeater or receiving circuit of a terminal. Further, it should be noted that the threshold detection level for determining whether or not the time slot contains a pulse or no-pulse is set at H/2. Thus, if the degradation which is caused by intereferences through crosstalk and noise in the transmission pair is equal to H/2, the eye would be closed. Thus, the maximum peak amplitude of the interfering signal is 6 dB when related to the peak amplitude of the pulse.

Figure 6:
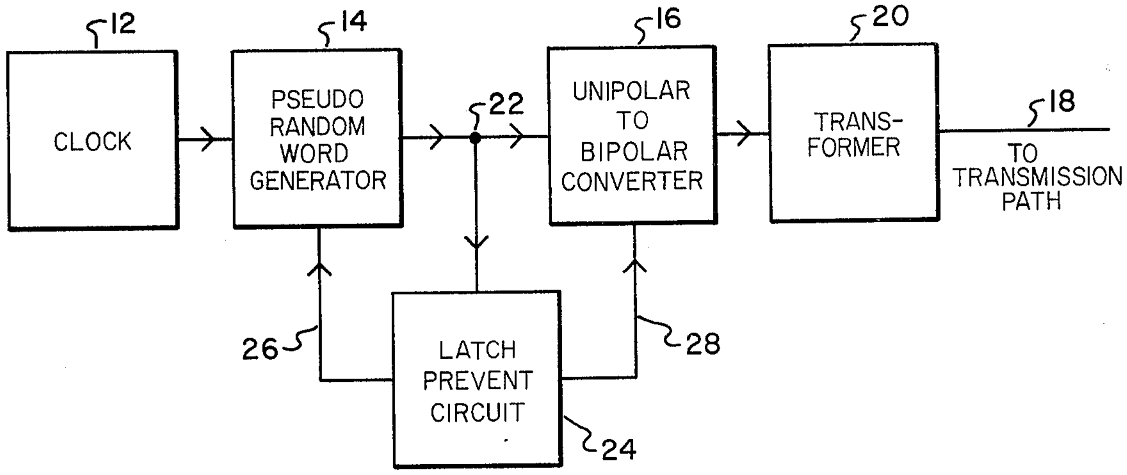
FIG. 6 is a simplified block diagram of a pseudo-random bipolar pulse generator that may be employed at the transmitting end of a cable in accordance with the teachings of this invention.

PCM systems in common usage in the telephone plant operate at a bit rate of 1.544 megabits per second. In order to test each cable section, it is necessary to have a device for generating a pulse signal which simulates that which would be obtained in the normal PCM transmission. Such a device is shown in FIG. 6 in which a clock 12 operates at 1.544 MHz and supplies clock pulses to pseudo-random word generator 14. Pseudo-random word generators are well known in the art and will not be described in detail here. Suffice it to say that generator 14 is to be arranged to provide a pulse, no-pulse combination of signals which will produce a broadband power spectrum. This output is applied to the unipolar-to-bipolar converter 16 and thence to transformer 20 and to transmission path 18, which is to be tested. The latch prevent circuit 24 connected between the pseudo-random word generator 14 and the unipolar-to-bipolar converter 16 is of a design which is well known and is used to prevent the pseudo-random word generator from latching up in an all zero state.

Figure 7:
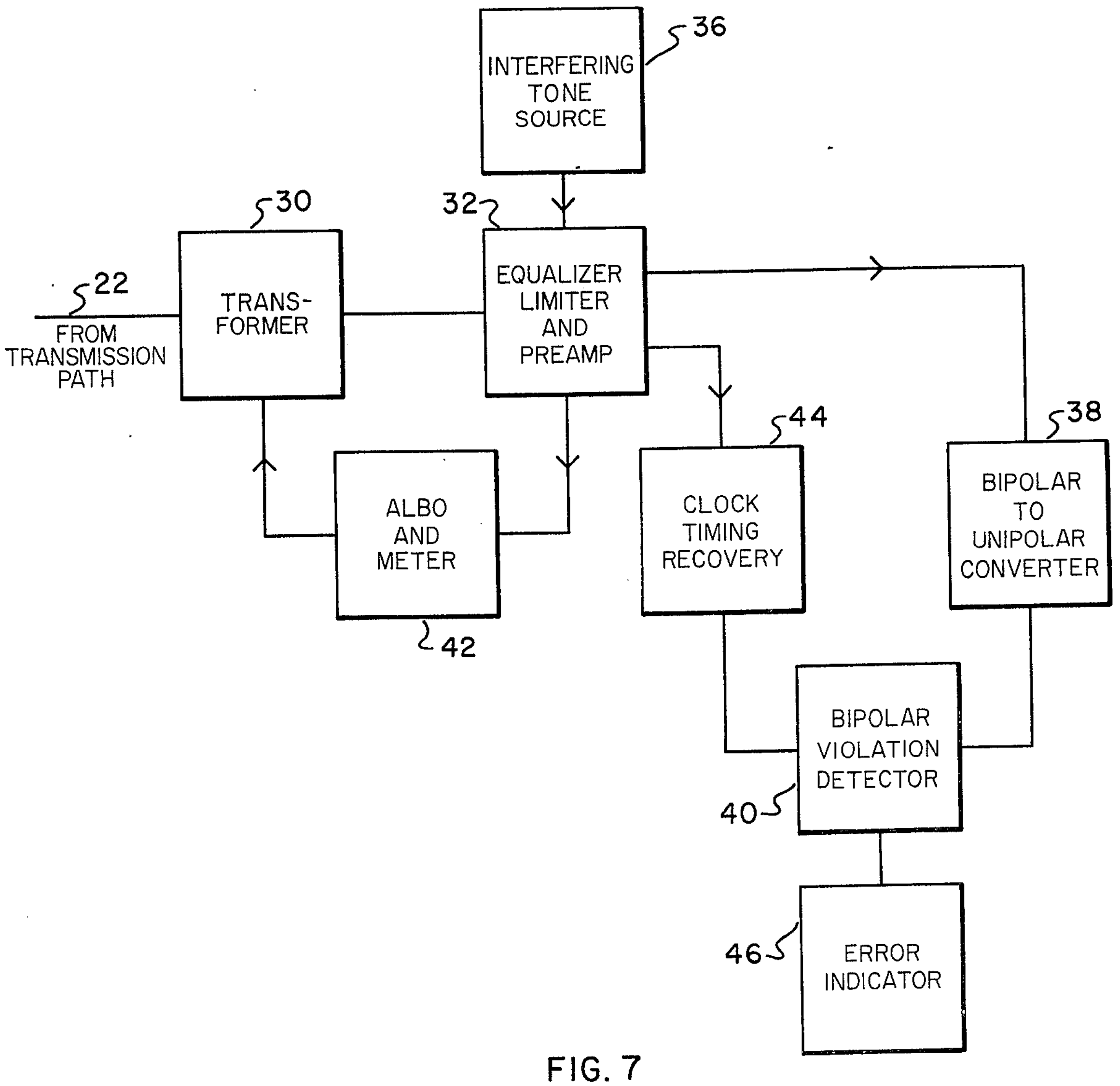
FIG. 7 is a simplified block diagram of a receiving end test circuit, including an interfering tone source, an error indicator, and level meter.

At the receiving end of the cable section under test, the bipolar pulse train is equalized and amplified and an interfering tone signal is added until the level of the interfering tone is such as to cause errors which are indicated by a bipolar violation detector. A block diagram of a circuit arrangement which will perform these functions is shown in FIG. 7. Here, the pulse train from transmission path 22 enters transformer 38 and passes to equalizer, limiter, and preamplifier 32. The limiter circuit arrangement is necessary since it is possible the cable section will be quite short and the amplitude of the input signal would be excessive. An automatic line build-out network 42 acts in conjunction with transformer 30 and the equalizer, limiter, and preamplifier arrangement 32 in order to compensate for variations in line length which will necessarily occur. An adjustable amplitude of interfering tone is applied at the preamplifier stage from tone source 36. While tones having other form factors may be used, the form factor used in this embodiment was that of a sine wave, and its frequency was 386 kHz. It should be noted that a good portion of the energy in the pulse train occurs at a frequency of 772 kHz because of the bipolar form factor and the attenuation loss at the bit rate, which is about 15 dB greater at 1.544 MHz. Thus, it is apparent that the interfering tone may readily add or subtract from the amplitude of the incoming pulses. A composite signal, which includes the equalized and amplified pulse train and the interfering tone, is applied to bipolar-to-unipolar converter 38, which rectifies the bipolar signal, detects whether or not a pulse is present, and applies this pulse, no-pulse output to bipolar violation detector 40. The amplitude of the interfering tone source is increased until errors occur and are indicated by error indicator 46, which is connected to the output of violation detector 40. The timing for the detection of the pulse, no-pulse condition of the unipolar signal is obtained by the clock timing recovery circuit 44 which uses the energy from the incoming pulse train to generate the clock timing frequency of the detection circuitry. Thus, the effect of timing errors in detection is minimized.

Figure 8:
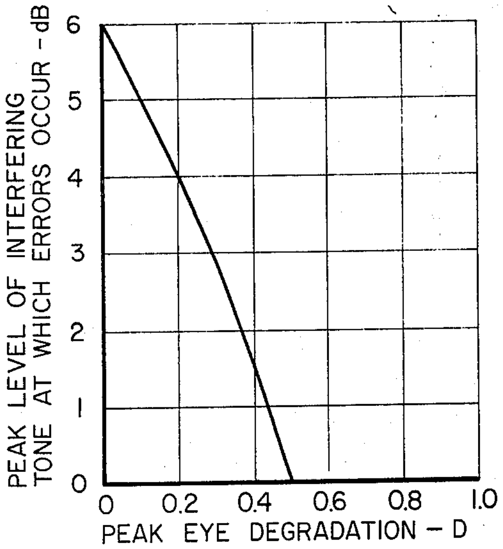
FIG. 8 is a graph of the peak interfering tone amplitude versus eye degradation factor.

As noted hereinabove, if the amplitude of the signals which interfere with the received pulse train is equal to one-half of the peak amplitude of the equalized and amplified received signal, the eye, in effect, would be closed and errors would occur and would be indicated on error indicator 46. Thus, if the transmission path had no peak eye degradation whatsoever, the maximum amplitude from the interfering tone source 36 would be 6 dB with respect to the peak signal of the pulse train. Thus, if one could add a peak 6 dB of interfering tone level, then one could say that the peak eye degradation factor of the cable section under test was equal to zero. The relationship between the peak level of interfering tone, at which errors occur, versus peak eye degradation is shown in FIG. 8. Theoretically, all optimum cable sections, not exceeding the maximal length limitations, should exhibit D factors equal to zero. In practice, due to circuit limitations, D factors for optimal cable sections will range from between 0.1 and 0.3. Cable sections with D factors ranging between 0.3 and 0.5 are acceptable for PCM transmission but, as shown in FIG. 5, the system noise margin has been reduced from 3 to 6 dB. Cable sections with D factors over 0.5 are not acceptable. The amplitude control device for the interfering tone source 36 is calibrated and is read on the basis of error indications exhibited on error indicator 46. From this one can determine whether or not the cable section is suitable for the transmission of standard PCM cables which use the 1.544 Megabit rate.

Figure 9:
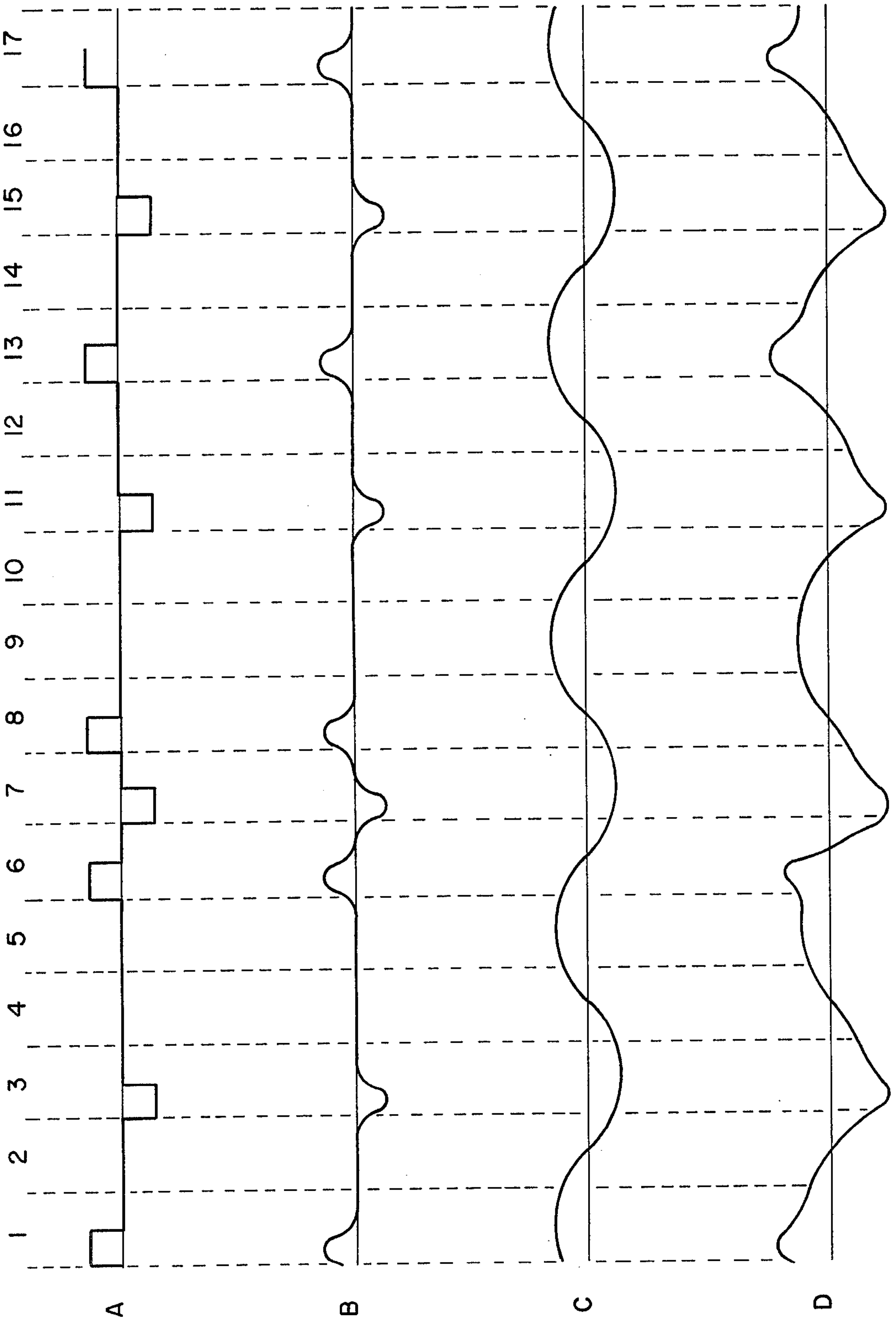
FIG. 9 is a series of waveforms which may occur in the transmission path and in the test circuits.

The waveforms under consideration are shown pictorially in FIG. 9. These are representative only and are not to be construed as representing the actual random generated pattern of the pulse train output or the received waveform of the cable pair at the receiving test end, but they do generally, at any rate, illustrate that which could occur and are useful in explaining the effect of the transmission medium and of the interfering tone on the signal for testing purposes. Waveform A is a pseudo-random, bipolar pulse train as one might expect would be transmitted out of unipolar-to-bipolar converter 16 and transformer 20 to transmission path 18 as is illustrated in FIG. 6. Waveform B is representative of the bipolar pulse train after transmission over the cable and after equalization and amplification. This signal would be applied to regeneration equipment at the repeaters or terminal. Waveform C is representative of an interfering tone that could be used for testing and is applied from interfering tone source 36. Waveform D is a summation (linear) of waveforms B and C and is the waveform that would actually be applied to the regeneration circuits. Any degradation in B caused by the cable will show up as a lower error threshold when C is added. Since it is quite clear that the equalized and amplified signal would not be as perfect as that shown in A, the marginal situations are indicated could be worse than illustrated. It is to be noted that digit time slots 8 and 9, FIG. 9, could be incorrectly determined because of the effect of the interfering tone.

Figure 10:
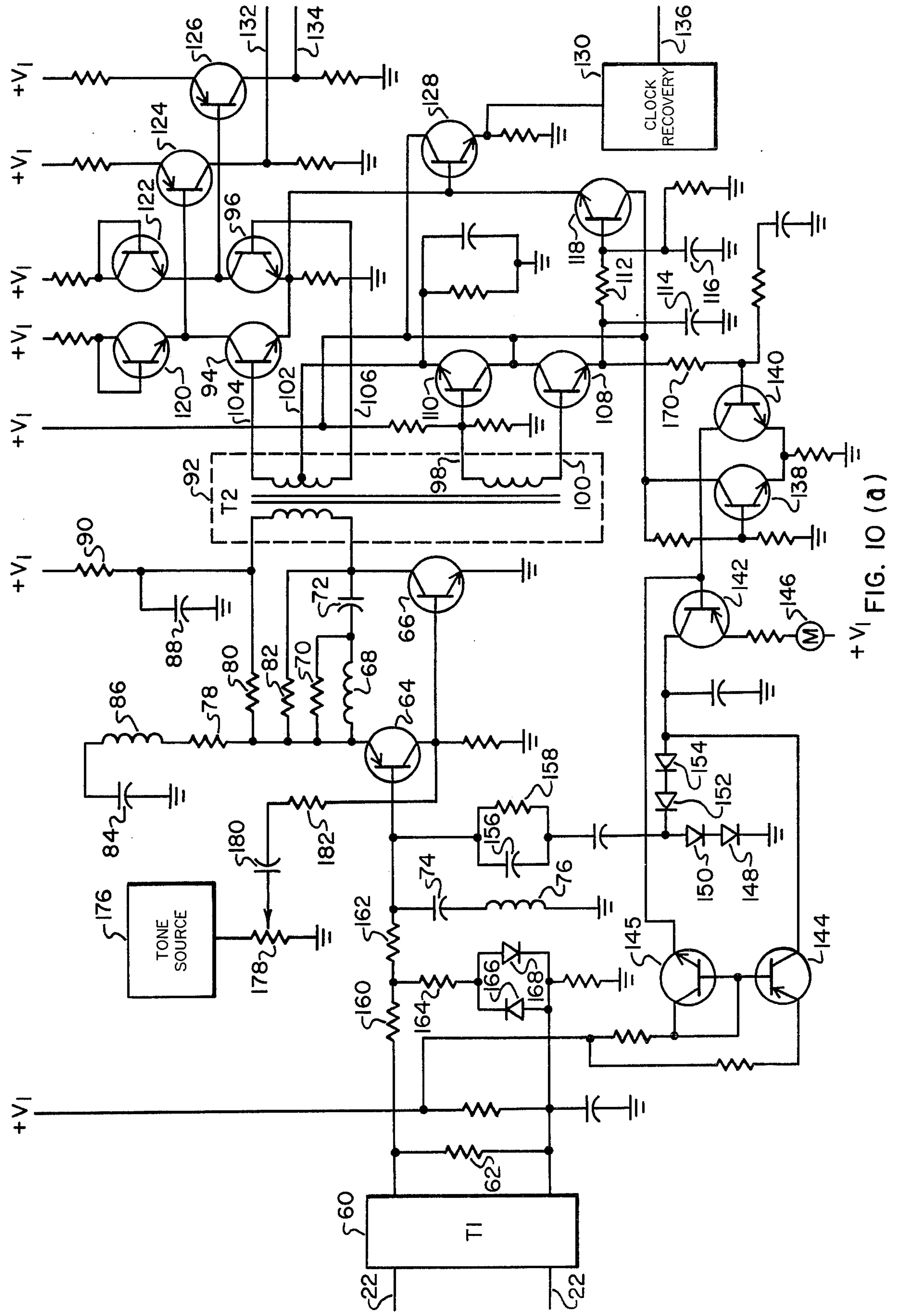
FIG. 10(*a*) is an electrical circuit and block diagram of a receiver test circuit which includes the interfering tone source, equalizer, preamplifier, clock recovering circuit, and threshold circuitry and, in combination with FIG. 10(*b*), performs the cable test functions according to the teachings of this invention.
Figure 10B:
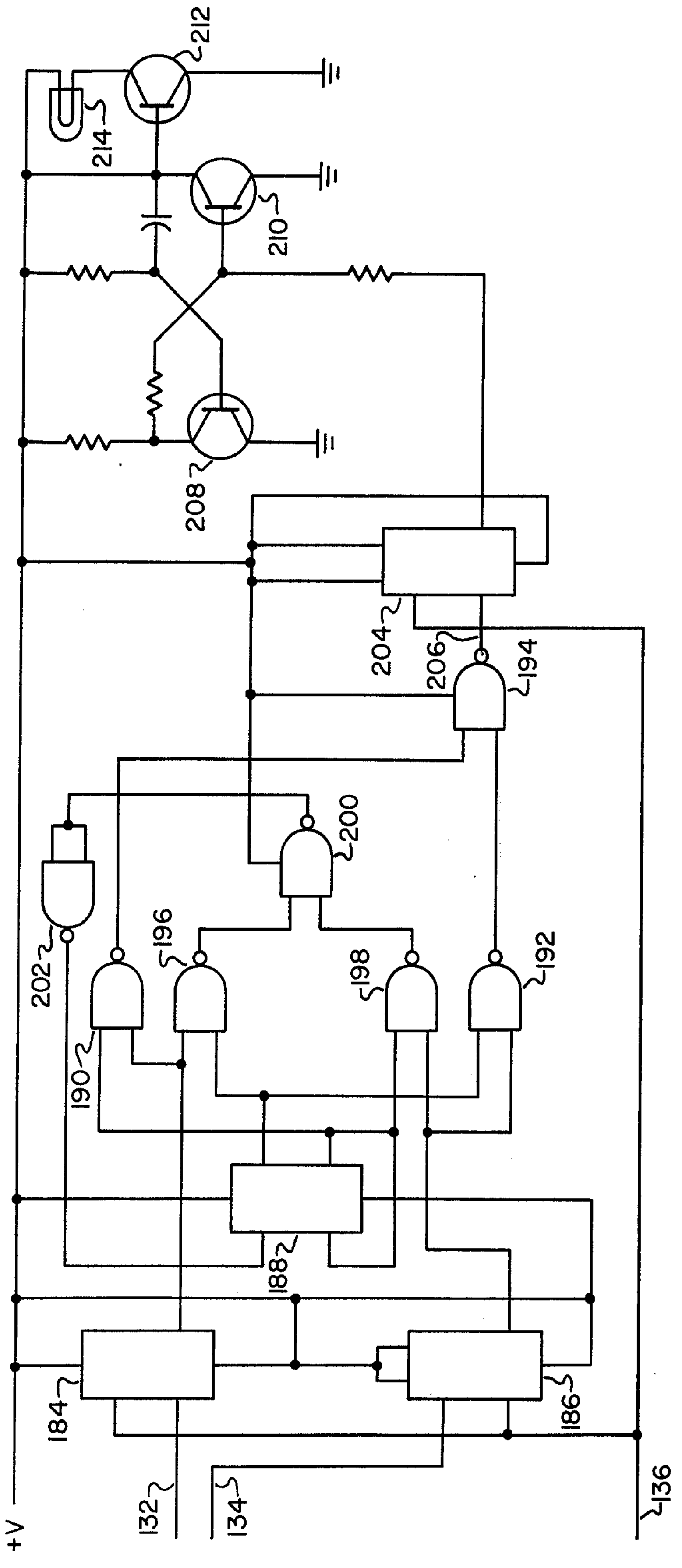

A detailed circuit arrangement which more particularly illustrates the various functions of the receiving circuitry needed to measure the transmission path loss and the D factor for PCM transmission is shown in FIGS. 10(*a*) and 10(*b*). FIG. 10(*a*) shows the input circuit, feedback amplifier, peak detector, level selector, clock recovery circuit, automatic line build-out, and a controlled interfering tone source for the receiving section of circuitry. FIG. 10(*b*) shows the bipolar violation detector and error indicating circuits which would be connected via leads 132, 134, and 136 with the output of the receiving section illustrated in FIG. 10(*a*). PCM signals from the cable section enter the receiving section via leads 22 at the input to transformer 60. The combination of transformer 60 and resistor 62 provide a balance termination for the line.

The feedback preamplifier consists of transistors 64 and 66 and associated components. Capacitor 74 and inductor 76 suppress the preamplifier's response to the second lobe of the power spectrum. It is well known that although the power spectrum of a bipolar pulse train has a spectral null at the bit rate, there is in fact energy at a frequency that is greater than the frequency which is equal to the bit rate. The suppression of the second lobe of the power spectrum of the pulse train is a necessary condition to minimize jitter in the timing waveform. Resistor 70, inductor 68, and capacitor 72 are used to reduce the gain of the amplifier at higher frequencies. Resistors 78, 80, and 82 plus capacitor 84 and inductor 86 form part of an equalizer network designed to match the cable response fall-off, allowing the closed loop gain to rise 6 dB per octave starting at 80 kHz. Capacitor 88 provides ac bypass and resistors 80, 82, and 90 provide dc feedback for bias stabilization.

Interstage transformer 92 serves the dual purpose of providing push-pull operation for the level selector transistors 94 and 96, and setting the slicing level at half pulse amplitude. The latter is accomplished by making the number of turns between output winding leads 98 and 100 one-half those of the winding leads between 102 – 104, or 102 – 106. The output of the peak detector 108 is therefore a dc bias equal to half the pulse height.

The peak detector is composed of transistor 108. Transistor 110 provides temperature compensation for transistor 108. Resistor 112 and capacitors 114 and 116 form part of an RC filter. The output of the RC filter is used to drive emitter follower 118 which, in turn, sets the quantizing threshold for the level selector network.

The level selector is composed of transistors 94 and 96 and associated components. Transistors 94 and 96 act as a full-wave rectifier, but because of bias established by threshold setter 118 they serve the dual purpose of eliminating the base line from the pulse train, which eliminates noise from the clock recovery circuit, and slicing of the pulse train, i.e., bipolar-to-unipolar conversion. Transistors 120 and 122, connected as diodes, provide compensation for buffer stages 124 and 126, thus contributing to threshold stability. Transistors 124 and 126 provide the interface between the level selector and the bipolar violation detector.

The clock frequency is derived from a circuit which consists of transistor 128, and a recovery circuit 130. The recovery circuit is conventional and consists of a tank circuit, a differential amplifier, and associated components. Transistor 128 provides the interface between the level selector and the tank circuit. The tank circuit is a high Q circuit ($Q = <100$) designed to ring at a frequency of 1.544 MHz. The differential amplifier is used to square up the sinusoidal output of the tank circuit. To improve the stability and clock symmetry, a buffer stage is included between the differential amplifier and the output lead 136.

In order to provide a normal input level signal to the preamplifier transistor 64, an automatic line build-out network is connected between transformer 60 and the base of transistor 64. The automatic line build-out network consists of a comparator circuit, transistors 138 and 140, and their associated components, an error signal amplifier circuit consisting of transistors 142, 144, and associated components, a control current monitoring meter 146, a line build-out circuit consisting of diodes 148, 150, 152, 154, a shunt resistor 158, a shunt capacitor 156, series resistors 160 and 162, and a limiter circuit consisting of shunt resistor 164 and diodes 166 and 168 in series with resistor 164. The control signal for the automatic line build-out network comes from the output of the peak detector and is fed to the base of comparator transistor 140 through a lead-lag network consisting of series resistors 170 and 172 and capacitor 174. This control signal is compared to a fixed reference voltage which is applied to the base of comparator transistor 138 which results in an error signal at the collector of comparator transistor 140. The error signal is fed to the error signal amplifier consisting of transistors 142 and 144 whose output provides a variable control current to the diodes 148 through 154. As the input signal varies in amplitude due to changes in cable length or cable characteristics, the impedance of diodes 148 and 150 changes in such a way as to maintain a constant signal level at the base of transistor 64. The limiter circuit composed of series resistor 164 and parallel diodes 166 and 168, connected in series with said resistor, improves the range of the automatic line build-out circuit by amplitude limiting the input signal when testing one short cables, i.e., cables 1500 feet or shorter.

As it was pointed out hereinabove, the receiving circuit provides means for measuring the input signal level, a measure of the electrical length of the cable pair. This measurement is accomplished by milliammeter 146, which is in series with the emitter of control transistor 142. If the cable pair under test is short, the input signal level is large and a large control current flows through meter 146. Two control current transistors are needed because the control current is highly nonlinear, ranging from a few microamps for cable lengths of 7,000 feet to over 2.5 milliamps for cable lengths of 1,000 feet or shorter. Transistor 144 is designed to provide a meter bypass for the control current when testing short cable pairs so as to keep the meter movement within the scale.

A controlled interfering tone from source 176 is applied to tone level control potentiometer 178. As mentioned hereinabove, the frequency of the interfering tone is 386 kHz. Potentiometer 178 is used to control the amount of interfering tone injected into the preamplifier stage 66. This level control 178 is calibrated in terms of a peak normalized eye degradation factor (D). Capacitor 180 is a dc blocking capacitor used to avoid disturbing the dc biasing of the preamplifier stage. Resistor 182 provides a high output impedance for the noise source, thus essentially reducing the effect of the tone source 176 to a minimum with respect to the amplifier characteristic. In testing a cable pair, the "D" factor is determined by increasing the level of the interfering tone until an error indication is obtained, the "D" factor is then read from the control scale. The effect of the interfering tone was described hereinabove, and it will be recalled that the D factor is a function of the peak level of interfering tone as shown in FIG. 8.

The bipolar violation detector consists of flip-flops 184 through 186 and NAND-gates 190 through 202, FIG. 10(*b*). Flip-flops 184 and 186, controlled by the recovered clock signal, retime the data pulses. Flip-flop 188 serves as a one-bit memory, remembering the polarity of the previous pulse. Gates 190 and 192 compare the polarity of the previous pulse, the output from 188, with the polarity of the incoming pulse; a bipolar violation, a result of two adjacent pulses with the same polarity, enables one of the gates, which in turn enables gate 194. Gates 196 through 202 provide the memory-clear signal to flip-flop 188. Flip-flop 204 is used to eliminate spikes from the error detector output which appear on lead 206, thus preventing false triggering of the monostable multivibrator circuit. Transistors 208 and 210 with associated components form a monostable multivibrator. Under normal conditions, transistor 208 is ON and transistors 210 is OFF; therefore, transistor 212 is held OFF and the ERROR lamp 214 is OFF. When a bipolar violation occurs, transistor 210 is allowed to conduct for about 50 milliseconds, thus causing transistor 212 to conduct long enough to turn ERROR lamp 214 ON.

The detailed description of one embodiment of the invention has been directed to the use of a pseudo-ternary pulse train having a bipolar format. It would be apparent to those skilled in the art that the invention is not so restricted but is applicable to other pulse signals, e.g., binary, pseudo-ternary or multilevel signals, which are coded according to a predetermined set of rules, and which permit error detection when the coding rules are violated. The doubinary signal was discussed hereinabove as one other pseudo-ternary signal which meets these criteria.

I claim:

1. Apparatus for testing the pulse transmission characteristics of a cable pair which comprises:

means for generating a pseudo-ternary pulse train in accordance with predetermined coding rules, the violation of said rules being indicative of an error in the pulse train, for transmission of said pseudo-ternary pulse train over the cable pair;

means for generating an interfering tone signal;

level control means operatively connected between said interfering tone signal generating means and said violation detection means to add predetermined levels of the interfering signal with said pseudo-ternary pulse train until violation of the coding rules occurs; and, means for detecting violations in the coding rules of said pulse train and giving indications thereof.

2. Apparatus in accordance with claim 1 in which the pseudo-ternary pulse train is of a duobinary format.

3. Apparatus in accordance with claim 1 in which the pseudo-ternary pulse train is of a bipolar signal format.

4. Apparatus in accordance with claim 3 in which said bipolar signal is pseudo-random.

5. Apparatus for testing the pulse transmission characteristics of a cable pair which comprises:

a cable pair;

pulse generating means operatively connected to one end of said cable pair, said pulse means generating a pseudo-random, pseudo-ternary pulse train in accordance with predetermined coding rules, the violation of said rules being indicative of an error in the pulse train, for transmission over the cable pair;

pulse reconstructing means having an input connected to receive the pseudo-ternary pulse train transmitted over said cable pair, and having an output;

means for generating an interfering signal;

level control means operatively connected between the interfering signal and the output of the reconstructing means so that controlled amounts of interfering signal are added to the reconstructed pseudo-ternary signal until violation of the coding rules occur;

code violation detecting means having an output, and having an input operatively connected to receive the combined outputs from the pulse reconstructing means and said level control means; and, indicating means having an input connected to the output of said detecting means for indicating when said code violations occur.

6. Apparatus according to claim 5 wherein said pseudo-ternary pulse generating means further comprises:

means for generating a pseudo-random binary pulse train;

and, means for converting the pseudo-random binary pulse train into a duobinary pulse train.

7. Apparatus according to claim 6 wherein said reconstructing means further comprises:

amplifier means having an input and an output; and, equalizer means operatively connected between the input of the pulse reconstructing means and the input of the amplifier means.

8. Apparatus according to claim 5 wherein said pseudo-ternary pulse generating means further comprises:

means for generating a pseudo-random binary pulse train;

and, means for converting the pseudo-random binary pulse train into a pseudo-random bipolar pulse train.

9. Apparatus according to claim 8 wherein said reconstructing means further comprises:

amplifier means having an input and an output; and, equalizer means operatively connected between the input of the reconstructing means and the input of the amplifier means.

10. Apparatus according to claim 9 wherein said pseudo-ternary pulse generating means further comprises:

pseudo-random binary word generating means; and, timing means having an output connected to provide timing information to said word generating means, said timing means developing a timing signal having a rate equal to the pulse rate of the pseudo-random bipolar pulse train.

11. Apparatus according to claim 10 wherein said equalizer means is manually adjustable.

12. Apparatus according to claim 10 wherein said equalizer means is automatically adjustable.

13. Apparatus according to claim 12 wherein said reconstructing means further comprises:

amplitude limiting means having an input and having an output connected to the input of said equalizer means; and, impedance matching means having an input connected to the output of said cable pair, and an output connected to the input of said amplitude limiting means.

14. Apparatus for determining the pseudo-ternary pulse transmission performance of a cable pair which comprises:

means for reconstructing the received pseudo-ternary pulse train so that pulse, no-pulse decisions can be made, said reconstructing means having an input for connection to the receiving terminals of the cable pair, and an output;

means for generating an interfering signal;

level control means operatively connected between the interfering signal and the output of the reconstructing means so that controlled amounts of interfering signal may be combined with the reconstructed pseudo-ternary pulse train until errors occur;

means for detecting errors in the pseudo-ternary pulse train, said error detector having an input operatively connected to receive the combined interfering signal and reconstructed pseudo-ternary pulse train, and an output; and, error indicating means having an input connected to the output of said error detecting means.

15. Apparatus according to claim 14 wherein said level control means is calibrated to measure the eye degradation factor.

16. Apparatus according to claim 15 wherein said interfering signal generating means is a tone source having a frequency which is approximately one-fourth the bit rate of the pulse train.

17. Apparatus for testing the pulse transmission tolerance of a transmission path which comprises:

means for generating a pseudo-random, pseudo-ternary pulse train in accordance with predetermined coding rules, for transmission over said path, the violation of said rules being indicative of an error in the pulse train;

pulse reconstruction means having an output, and having an input for operative connection to the receiving end of the transmission path, said reconstructing means accepting the transmitted pseudo-ternary pulse train and providing a reconstructed pseudo-ternary pulse train at said output;

means for detecting coding rule violations in said regenerated pulse train and giving indications thereof;

means for generating an interfering signal;

level control means operatively connected between said interfering signal generating means and said detecting means to add selected levels of the interfering signal in the range of 0 to one-half the amplitude of a pulse in said reconstructed pulse train, said control means being calibrated to indicate the transmission tolerance when the interfering signal amplitude is adjusted to the level at which errors occur.

18. Apparatus in accordance with claim 17 wherein said interfering signal generating means is a tone source having a frequency which is approximately one-fourth the bit rate of the pulse train.

* * * * *